United States Patent von Haas et al.

[11] Patent Number: 5,503,509
[45] Date of Patent: Apr. 2, 1996

[54] CUTTING INSERT AND DRILLING TOOL FOR DRILLING IN SOLID MATERIALS

[75] Inventors: Rainer von Haas, Geesthacht; Manfred Wegener, Essen, both of Germany

[73] Assignee: Widia GmbH, Essen, Germany

[21] Appl. No.: 190,044

[22] PCT Filed: Jul. 7, 1992

[86] PCT No.: PCT/DE92/00562

§ 371 Date: Jan. 31, 1994

§ 102(e) Date: Jan. 31, 1994

[87] PCT Pub. No.: WO93/02824

PCT Pub. Date: Feb. 18, 1993

[30] Foreign Application Priority Data

Aug. 8, 1991 [DE] Germany .............. 41 26 241.7

[51] Int. Cl.⁶ ........................................ B23B 51/02
[52] U.S. Cl. ..................... 408/188; 408/194; 408/211; 408/224; 408/713
[58] Field of Search ............... 408/187, 188, 408/189, 194, 200, 211, 223, 224, 227, 713; 407/113

[56] References Cited

U.S. PATENT DOCUMENTS 4,648,760  3/1987  Karlsson et al. .................. 407/113
4,889,455  12/1989  Karlsson et al. .................. 408/224
4,889,456  12/1989  Killinger .......................... 408/224

FOREIGN PATENT DOCUMENTS

| 0054913 | 12/1981 | European Pat. Off. . |
|---|---|---|
| 0125568A1 | 5/1984 | European Pat. Off. . |
| 0162029B1 | 11/1985 | European Pat. Off. . |
| 0287904A3 | 10/1988 | European Pat. Off. . |
| 0181844 | 5/1990 | European Pat. Off. . |
| 1399654 | 4/1965 | France . |
| 2387723 | 11/1978 | France . |
| 2475438 | 8/1981 | France . |
| 2404029 | 11/1976 | Germany . |
| 2751255C2 | 10/1984 | Germany . |
| 2730418C2 | 5/1988 | Germany . |
| 3802290C1 | 6/1989 | Germany . |
| 3831046A1 | 3/1990 | Germany . |
| WO91/0839 | 2/1991 | WIPO . |

Primary Examiner—Daniel W. Howell
Attorney, Agent, or Firm—Herbert Dubno

[57] ABSTRACT

A drill having at least one and generally at least two cutting inserts fixed in a cutting end of the drill and in which each cutting insert is a polygonal body having at least three cutting vertices and respective cutting edges between the vertices which are set back so that cutting points are formed close to a vertex. The partial cutting edges formed by the setback extend rectilinearly to the cutting points and include an angle of up to 170° between them.

19 Claims, 9 Drawing Sheets

CUTTING INSERT AND DRILLING TOOL FOR DRILLING IN SOLID MATERIALS

CROSS REFERENCE TO RELATED APPLICATIONS

This application is a national phase of PCT/DE 92/00562 filed 7 Jul. 1992 and based, in turn, on German national application P 41 26 241.7 of 8 Aug. 1991 under the International Convention.

FIELD OF THE INVENTION

The invention relates to a cutting insert for drilling and, more particularly, to a cutting insert with at least three cutting angles delimiting the cutting face and with cutting edges lying between two adjacent cutting angles.

Further the invention relates to a drilling tool with a shaft and at least two replaceable, geometrically similar cutting inserts each having several cutting edges and arranged in a recess on an end of the shaft, these inserts being arranged at various radial distances on the shaft, their work ranges bordering on each other and partially overlapping, whereby each cutting insert has cutting edges with mutually inclined cutting edge areas which, when in operation, are all simultaneously engaged, whereby the radially innermost cutting plate borders directly on the drill axis or extends slightly beyond it.

Cutting inserts are known in many basic shapes, such as hexagonal, octagonal, pentagonal, triangular, round, rhomboidal and rectangular cutting plates, in some cases with increased corner angles. Particularly for drilling in solid materials hexagonal cutting plates are used, wherein two cutting edges include an obtuse angle of 120° to 170° for chip removal. The use of such cutting plates is described in DE 27 30 418 C2. In this system the cutting plates are each arranged in a recess of the drill shaft, so that the angle bisecting line of the engaged cutting edges is parallel to the drill axis or at a slight tilt thereto of a maximum of 2°.

The disadvantage of this drill is that an equilibrium of forces of the drill shaft can be established only when each two engaged cutting edges of a cutting plate are substantially engaged over their full lengths and the work ranges of neighboring cutting edges do not overlap. Furthermore, when the drilling diameter is changed, a new set of cutting inserts has to be used.

The same applies also when cutting inserts described in EP 0 181 844 B1 are used. These inserts in a top view show an approximately rectangular contour, whereby on opposites sides there are two cutting edge pairs arranged at a obtuse angle.

IN EP 0 054 913 B1 it is proposed to arrange the receiving recesses for individual indexable inserts in such a way that the radial cutting force components of the engaged cutting edges balance themselves out for each separate indexable insert, because angle bisecting lines of these cutting edge are inclined to parallels to the drill axis by an angle which depends on the effective length of the cutting edge engaged along a section.

In order to compensate the radial forces in DE 27 51 255 C2 it has also been proposed to angle the radial plane of the inner cutting insert backwards with respect to the peripherally arranged cutting insert by a certain angle, against the direction of rotation of the drill, in order to compensate for the radial forces acting on the drill shaft. However this orients the forces parallel to one another, but not compensate them, since the offset angle cannot have any influence on the magnitude of the radial and the cutting forces. Thus the forces are maintained as a function of the cutting conditions, not depending on the geometry of the tool.

Finally DE 38 02 290 C1 describes a drill for drilling through plate stacks, but also through monolithic solid material, to arrange a first indexable insert radially outside on a diameter beyond the half defined by the drill axis, and on the opposite side two smaller indexable inserts, whereby the effective outer cutting edge of the radially outer indexable insert runs approximately on the same work cone and on the same maximal radius as the radially outer cutting edge of the largest indexable insert. Also with this arrangement only a radial cutting force balance can be achieved.

In addition all of the aforementioned drilling tools have the drawback that chips produced by each cutting plate are relatively wide, which leads to increased friction of the chip flow along the chip grooves of the drill shaft. Particularly in the drills known to the state of the art the formation of snarl chips cannot be avoided. A further disadvantage of the drill is that it centers poorly, which as a rule could be eliminated only by using the pilot drills known in deep well drilling tools. However, a pilot drill increases construction cost and also requires additional provision for material wear due to the configuration of the indexable inserts used in this situation, which are different from the ones normally used.

In solid drills for large drill depths over the quadruple drill diameter it is also known to arrange in a cartridge on each of the drill shaft halves a pair of indexable inserts, i.e. a total of four indexable inserts are provided. However, this construction increases the number of indexable inserts to be replaced each time. Besides due to the standardized size of available indexable inserts, such a construction on drill for larger bore diameters is limited.

OBJECTS OF THE INVENTION

It is therefore the object of the present invention to provide an improved cutting insert and a drilling tool of the aforementioned kind, so that the formation of snarl chips is avoided, the chip removal is improved and that an improved guiding, particularly an improved centering of the drill is achieved, without additional cost.

Another object of this invention is to provide an improved drill which is free from drawbacks of earlier systems.

SUMMARY OF THE INVENTION

These objects are achieved with a cutting insert with at least three cutting angles and cutting edges lying between two adjacent cutting angles delimiting a rake face. According to the invention at least one of the cutting edges has two projecting cutting points. Preferably the cutting insert has two cutting points per cutting edge. As a consequence a single indexable insert has more than one cutting area for the chip, which goes hand in hand with a better chip removal. Also by correspondingly orienting this indexable insert, the centering of the drill can be considerably improved.

Particularly according to a further embodiment of the cutting edge, the number of cutting points and the number of cutting areas should be equal. This means that in an indexable insert with two cutting points two cutting areas should be formed, over which chips with a respective narrower diameter are formed, which ultimately facilitates the chip removal during drilling and facilitates chip breakage.

According to a further embodiment of the invention, each cutting edge has a substantially concave shape with a constriction which is preferably located in the middle of the cutting edge. By turning away from the heretofore-used hexagonal cutting plates with the respective obtuse angles between two adjacent cutting edges in the shape of an "offshoot protuberance", according to the invention the cutting edge middle, is rearwardly offset with respect to a connection line between two adjacent cutting edges, whereby two cutting areas per cutting edge are created. Preferably due to the constriction two cutting edge segments define an outer angle of less than 176°. More particularly this angle lies between 145° and 170°.

The formation of the cutting points of each cutting edge can be done especially by the cutting angles or the thereto adjacent cutting edge segment halves. In both cases the cutting point of each cutting edge lies close to the corner. When the cutting point is formed by a cutting angle, then the latter should preferably be rounded. A cutting point arranged in the angle area can be created preferably by making the corner with an enlarged corner angle. Thereby the two cutting points of a cutting edge should preferably be arranged in the respective cutting edge segment half which is close to the corner.

According to a further embodiment aimed especially at creating with the cutting insert or the drilling tool a drill hole surface which is as smooth as possible, each cutting angle delimiting a main cutting edge will have beyond the main cutting edge an extension designed as a secondary cutting edge, which will basically be parallel to the longitudinal axis of the drill hole or slightly inclined thereto at an angle of less than 10°. Since the cutting inserts are inserted basically with their median longitudinal axis, which is perpendicular to the connection line of the cutting angles of a main cutting edge, parallel to the longitudinal axis of the drill hole, this median longitudinal axis offers a constructive orientation line for the position of the secondary cutting edges. These secondary cutting edges have the effect that the drill hole wall during the cutting edge advance causes the already created drill hole surface to smoothen. Since the cutting edge describes a spiral-like curve, without the extension according to the invention in a cross section through the drill hole, between each two successive advance positions a ridge is formed, which is then removed by the secondary cutting edge in the form of a final finishing. It is essential that the secondary cutting edge required for this erosion be basically parallel to the longitudinal axis of the drill hole or slightly inclined with respect thereto by a small angle. Preferably the inclination with respect to the longitudinal axis of the drill hole should not be larger than 1° to 2°.

According to a further embodiment of the invention the length of the extension meant to be the secondary cutting edge should correspond to the length of the drill advance at a single drill turn, preferably up to 2/10 mm in the case of smaller drills of up to 20 mm diameter of the drill hole and in the case of larger drills for up to 60 mm of drill hole diameter it should amount to 0.2 to 1.2 mm.

Thereby the cutting angle can be either continuously rounded or can have short straight cutting areas, approximately in the shape of a chamfer.

Cutting inserts of a basic rhomboidal or triangular shape with a nose segment arranged in the cutting angle or with at least one main cutting edge connected to the nose segment, wherein the nose segment is extended in the width direction at a sharp-angle cutting corner and consists of a number of curved segments which are arranged substantially symmetrically about a median of the cutting angle are known from EP 0 162 029 B1. However this cutting insert series for purposes which are not addressed here, such as longitudinal turning, turning for inward profiling, relief grinding and outward profiling. In this cutting insert the nose segment serves only as a shortened effective cutting edge, so that this cutting insert can be used only for the mentioned tasks, but not for drilling.

Furthermore, preferably the distance of the constriction to the cutting point with reference to a vertical to the connection line between the cutting angles should range between 0.1 and 1.8 mm. With this distance, the distance between two parallel lines is meant, which run on one side through the lowest point of the constriction and through the point of the cutting edge on the other side, and which run parallel to the connection line between the cutting angles.

Preferably each cutting edge is shaped so as to be axially symmetrical with respect to its mid-perpendicular.

The area of the mentioned constriction can be shaped to be either angled by correspondingly shaping the lateral surfaces of the cutting plate, however it is preferably to make them rounded. The cutting insert should especially have a substantially triangular or square shape (when seen from the top) and/or be designed as an indexable insert.

Regarding the configuration of the lateral surfaces or respectively free surfaces in view of the formation of a free angle, as well as the cutting faces, one can refer back to the basic embodiments known to the state of the art. The cutting face can for instance have a chamfer and/or a chip-breaking groove as well as chip-forming elements added to the cutting edge.

The drilling tool of the invention can comprise:
 a shaft (26) and at least two replaceable and geometrically similar cutting inserts arranged in a recess on an end of the shaft. Each insert has several cutting edges and the inserts are arranged at various radial distances on the shaft with work ranges are adjacent to each other and overlap partially, whereby each cutting insert has cutting edges with partial cutting edge segments inclined towards each other, which are simultaneously engaged when the tool operates. The radially innermost cutting insert borders directly on the drill axis or extends slightly beyond the same.

According to the invention the seats for the individual cutting inserts are designed so that each of the engaged cutting edges has at least two protruding cutting points, whereby the perpendicular to the connection line between two adjacent cutting angles of the innermost cutting insert is inclined with respect to the longitudinal shaft axis by such an angle that the innermost cutting point of each cutting insert projects in relation to the adjacent engaged cutting point in axial direction of the drilling tool by a greater extent than the manufacturing tolerance of the seat and the cutting insert, preferably by more than 0.05 mm. The advantage of this drill is that, with the identical drill hole diameter, instead of two relatively wide chips four correspondingly narrower chips are formed, which can be better removed over the spiral-shaped chip-removal groove of the drill, and which also break much easier, so that the formation of snarl chips can be avoided. Due to the formation of two rake faces per indexable insert with the provision that the inner cutting point serves at the same time for the centering of the drill, a solution of simple construction but with improved alternate guidance is created especially for drill hole diameters of 14 to 18 mm.

Cutting inserts are provided adjacent to each inner cutting insert arranged rearwardly offset by an extent in the axial direction of the drilling tool, preferably by a value which exceeds the acceptable manufacturing tolerance, particularly 0.1 mm. This measure is particularly aimed at further centering of the drill.

In order to insure the most uniform run of the drill in the drill hole, further the cutting insert adjacent to the inner cutting insert with its cutting point projecting in the axial direction of the drilling tool is arranged in a cutting plane which lies between the cutting plane of the protruding cutting point and the cutting plane of the rearwardly offset cutting point of the inner cutting insert, preferably in the middle of the mentioned cutting planes of the inner cutting insert. In a further embodiment of this concept the cutting-plane distance between the plane created by the frontal cutting point and the one created by the rearwardly offset cutting point of a cutting insert is greater than 0.02 mm, preferably greater than 0.04 mm.

As a rule the cutting inserts can be oriented at will, i.e. parallel to the longitudinal axis of the drill or tilted. However, it is preferable to have all cutting inserts tilted at the same angle. This angle, formed by a perpendicular to the connection line between two adjacent cutting angles of the engaged cutting edge of all cutting inserts with the longitudinal axis of the shaft, ranges preferably between 1° and 10°.

In order to take into consideration all influences beyond the radial force components during drilling and in order to cover the possible largest area of stepped drilling diameters with few cutting inserts, it is further proposed that at least one of the perpendiculars to the connection line between two adjacent cutting angles of an engaged cutting edge of a cutting insert be inclined with respect to the longitudinal shaft axis by an angle up to 25°, whereby at least one of the perpendiculars runs at an angle which differs from 0 with respect to another perpendicular, so that sum differing from 0 of the resulting radial force component of all effectively engaged cutting edges and the corresponding sum of the horizontal force components, which preferably is 0, leads to a total resultant acting upon the cutting edges which is oriented in the direction of the radially outermost cutting insert or an angle which differs therefrom by a maximum of 45°. Due to this measure it is possible to cut drill holes whose diameter is slightly larger than the diameter of the drill. This creates the advantage that the drilling tools cannot jam in the bore, and then when the drill shaft is withdrawn no retraction scoring occurs. The inclination angle at least of the perpendicular of the outer cutting insert with respect to the longitudinal shaft axis depends in the first place on the angle formed by the engaged cutting areas of the effective cutting edge of each cutting insert, further from the degree of overlapping of the work areas of the used cutting inserts and also finally on the relation of the inclination angles of the perpendiculars of the used cutting inserts with respect to each other. Experience has shown that with identical angles of the cutting areas of the cutting edges in engagement and with firmly predetermined inclination angles of the inner cutting insert, which can also be 0, the inclination angle of the radially outer cutting insert has to be selected larger with the decreasing drilling diameter. The same applies also when the cutting insert with larger mutual inclination angles of the cutting areas are used. Preferably the perpendicular to a connection line between cutting angles of an effective cutting edge of the inner cutting insert is inclined by a smaller angle with respect to the longitudinal shaft axis than the angle of the respective perpendicular of the outer indexable insert. The cutting areas of the cutting inserts can be selected to be equally large, up to a deviation with the overlapping degree of 1 to 3.

This embodiment of the invention makes it possible to design of the seat for the radially external cutting insert so that the cutting insert can be arranged at various radial distances. This makes it possible to use the same set of cutting inserts for various drilling diameters.

Preferably the seat or seats of the drilling tool for receiving the cutting inserts are designed so that the respective contact surfaces touch the corresponding surfaces of the cutting insert only in the areas where the cutting insert does not produce any chipping. This insures that a cutting insert designed as an indexable insert fits optimally into the plate seat, even when the respective cutting edge in the effective cutting area is already worn out, since the indexable insert comes to be applied only outside this area.

Preferably the drill seats are fitted to such cutting inserts which beyond the cutting angle have an extension meant as a secondary cutting edge, which is basically parallel to the longitudinal drill axis or inclined thereto by an angle of less than 10°, preferably of 1° to 2°. This secondary cutting edge serves for smoothing the already created shell surfaces of the drill hole. This embodiment is actually preferred for indexable inserts of rectangular cross section, which have two opposite mutually parallel cutting edges. However also triangularly shaped cutting plates can be structurally modified this way, so that they have an extension in the form of a secondary cutting edge.

BRIEF DESCRIPTION OF THE DRAWING

The above and other objects, features, and advantages will become more readily apparent from the following description, reference being made to the accompanying drawing in which:

FIG. 7b is an end view of the drilling tool according to FIG. 7a;

SPECIFIC DESCRIPTION

Figure 1:
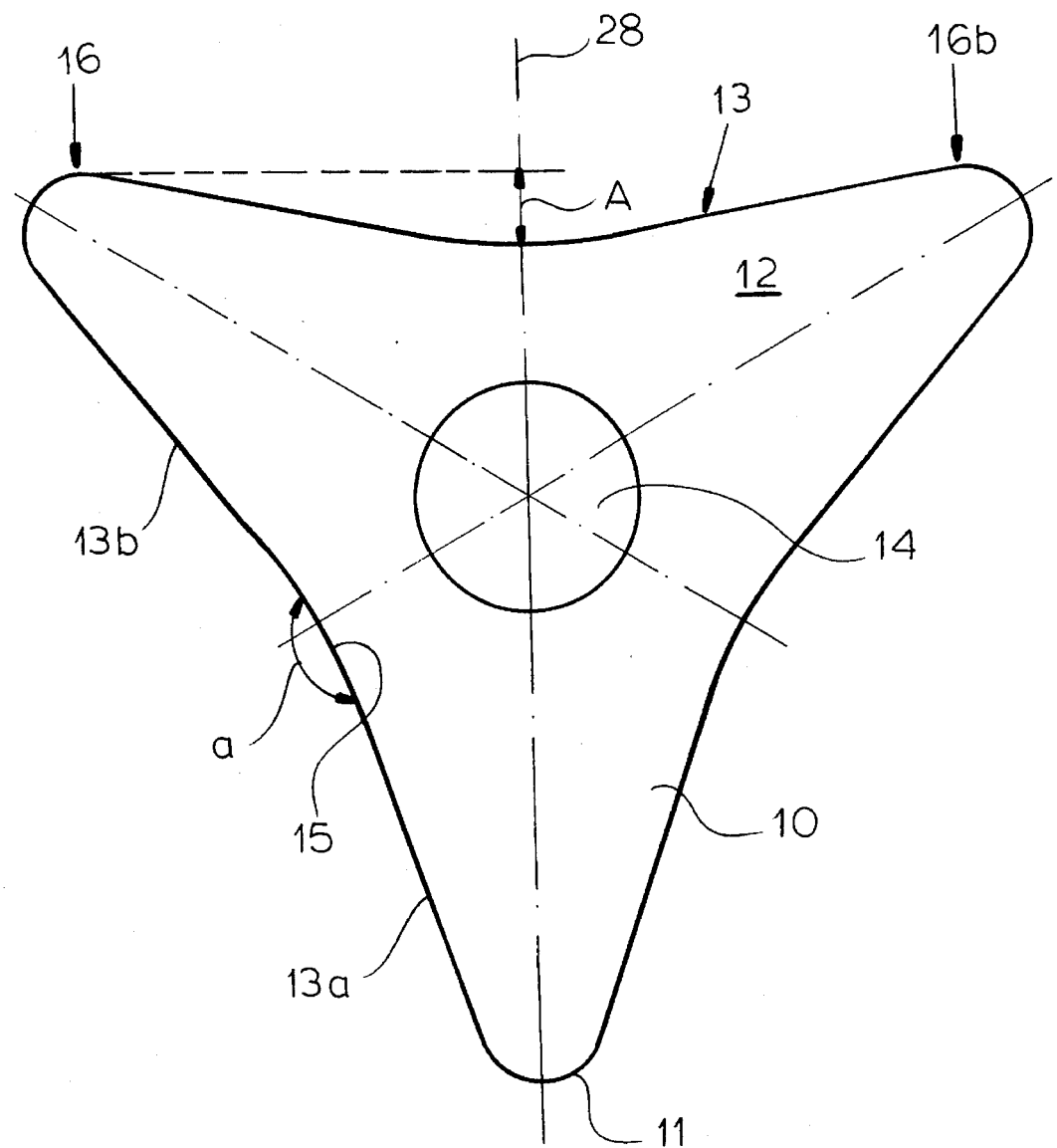
FIGS. 1 and 2 are respective top views of cutting inserts according to the invention with a substantially triangular basic shape.

The cutting insert 10 shown in FIG. 1 has a substantially triangular basic shape with three cutting angles or vertices 11, which together with the cutting edges 13 define the rake face 12. In a manner known to the art, the cutting insert also has a mounting hole 14. The cutting vertices are rounded in FIG. 1.

Each of the three cutting edges 13 is subdivided into two partial cutting edge areas 13a and 13b, each of which is rectilinear and extends from the cutting edge angle approximately to the middle of the cutting edge 13. The partial cutting edge areas form an angle a of 162°, so that a basically concave shape with a constriction or setback 15 results. In contrast with embodiments with a so-called roof-like arrangement of the partial cutting edge areas heretofore-known to the state of the art, which create only one cutting point between two cutting edges, two cutting points per cutting edge 13 are created with the setback, in the present case the cutting points 16a and 16b in the region close to the angles. The cutting edge segments extending here to the middle of the cutting edge serve as cutting areas during drilling, so that by means of the two cutting points 16a and 16b two cutting areas are created per cutting edge.

Figure 2:
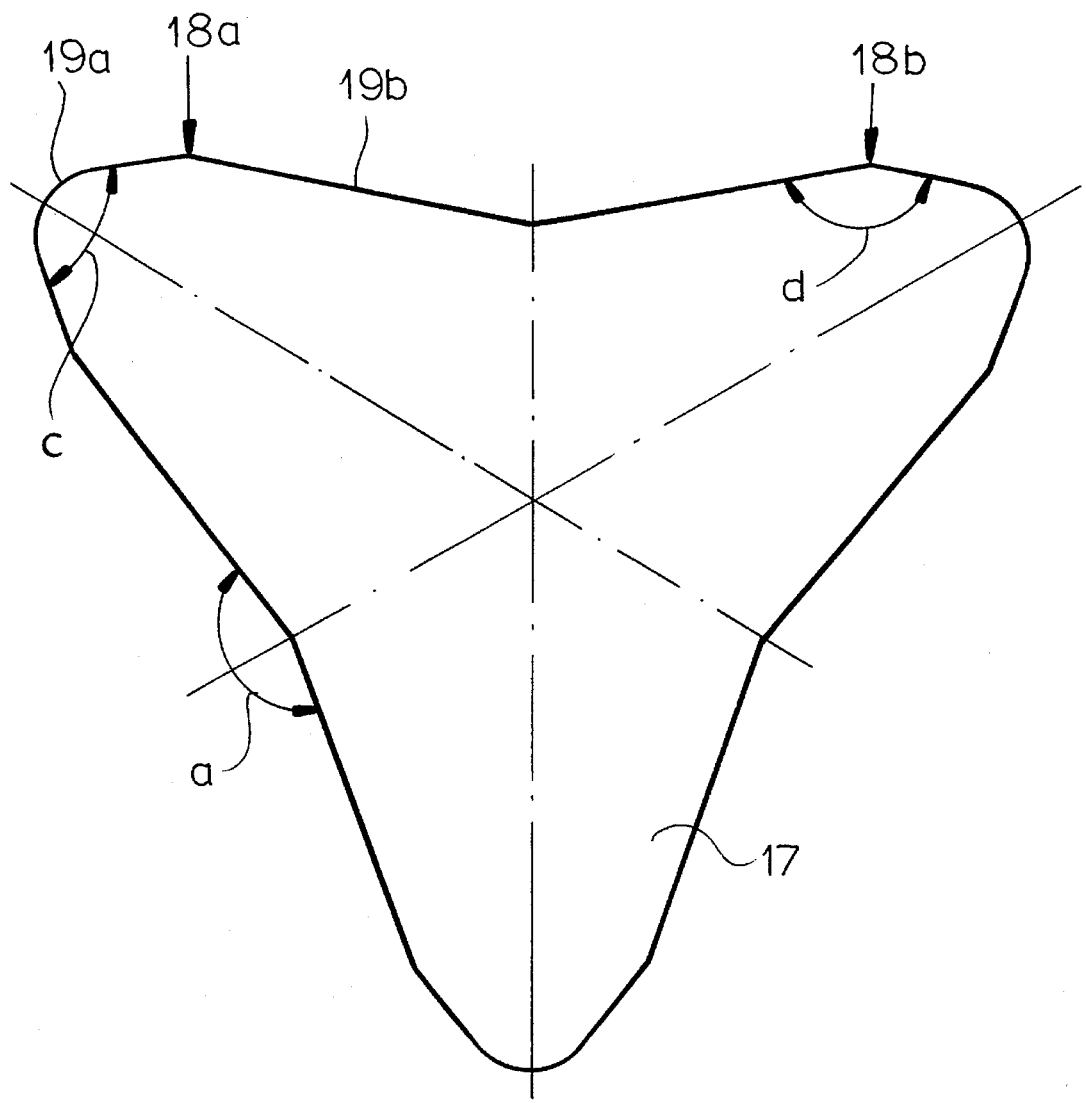

FIG. 2 represents a modification of the cutting insert 10 in FIG. 1 in which the corner angle c is increased. Due to the corner angle increased to 82° the indexable insert 17 has more sharply defined cutting points 18a and 18b, each shaped like a roof and forming a boundary between the regions 19a close to the corner and the areas 19b serving as cutting regions. The roof angle d of cutting points 18a and 18b, as well as the angle formed by the mutually inclined partial cutting edge areas 19b are each 160°. In addition designs corresponding to those shown for the cutting insert of FIG. 1 apply to the cutting plate shown in FIG. 2, which can also be an indexable insert.

Figure 3:
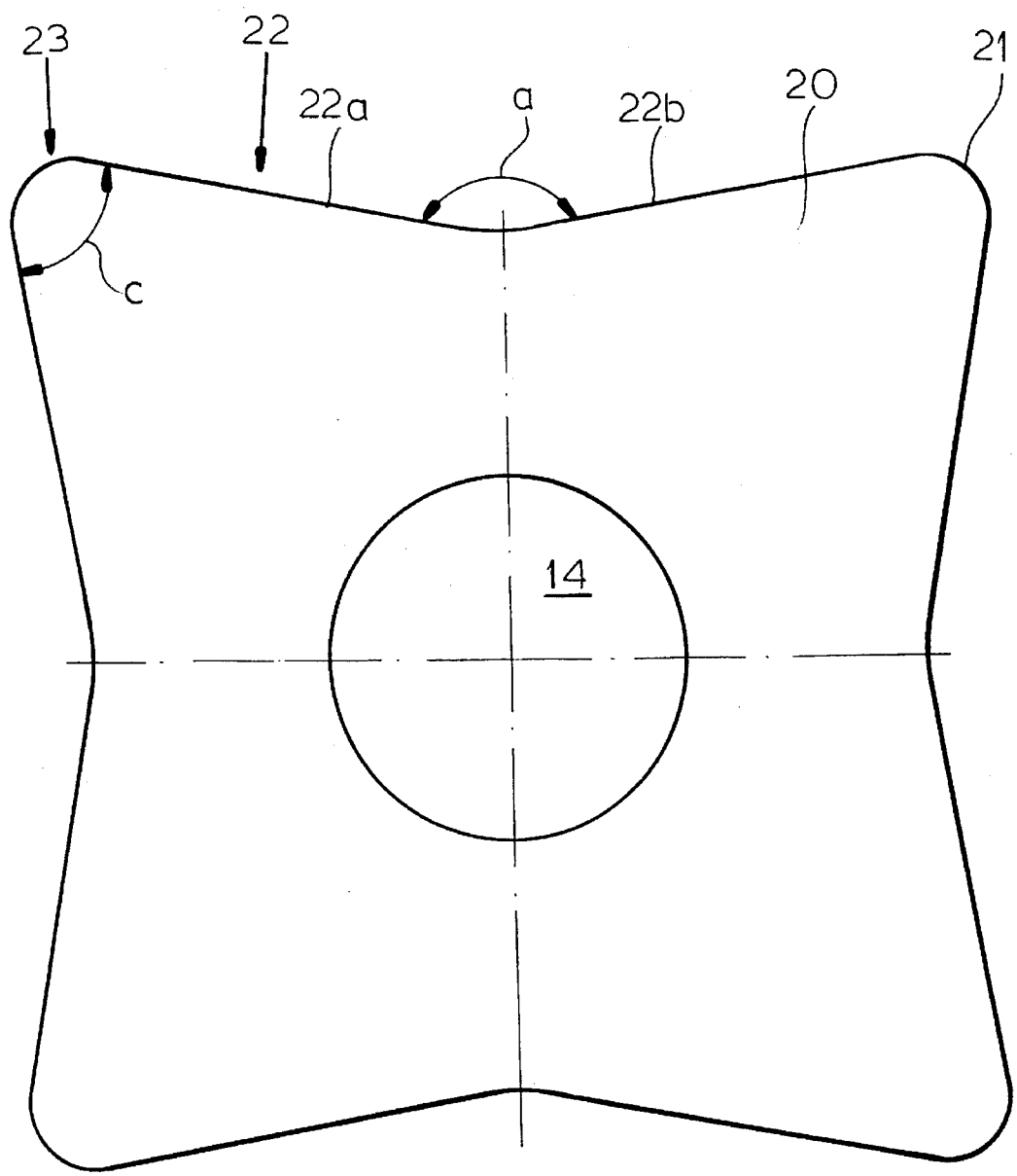
FIGS. 3 and 4 are corresponding top views of alternative cutting inserts with a substantially square basic shape.
Figure 4:
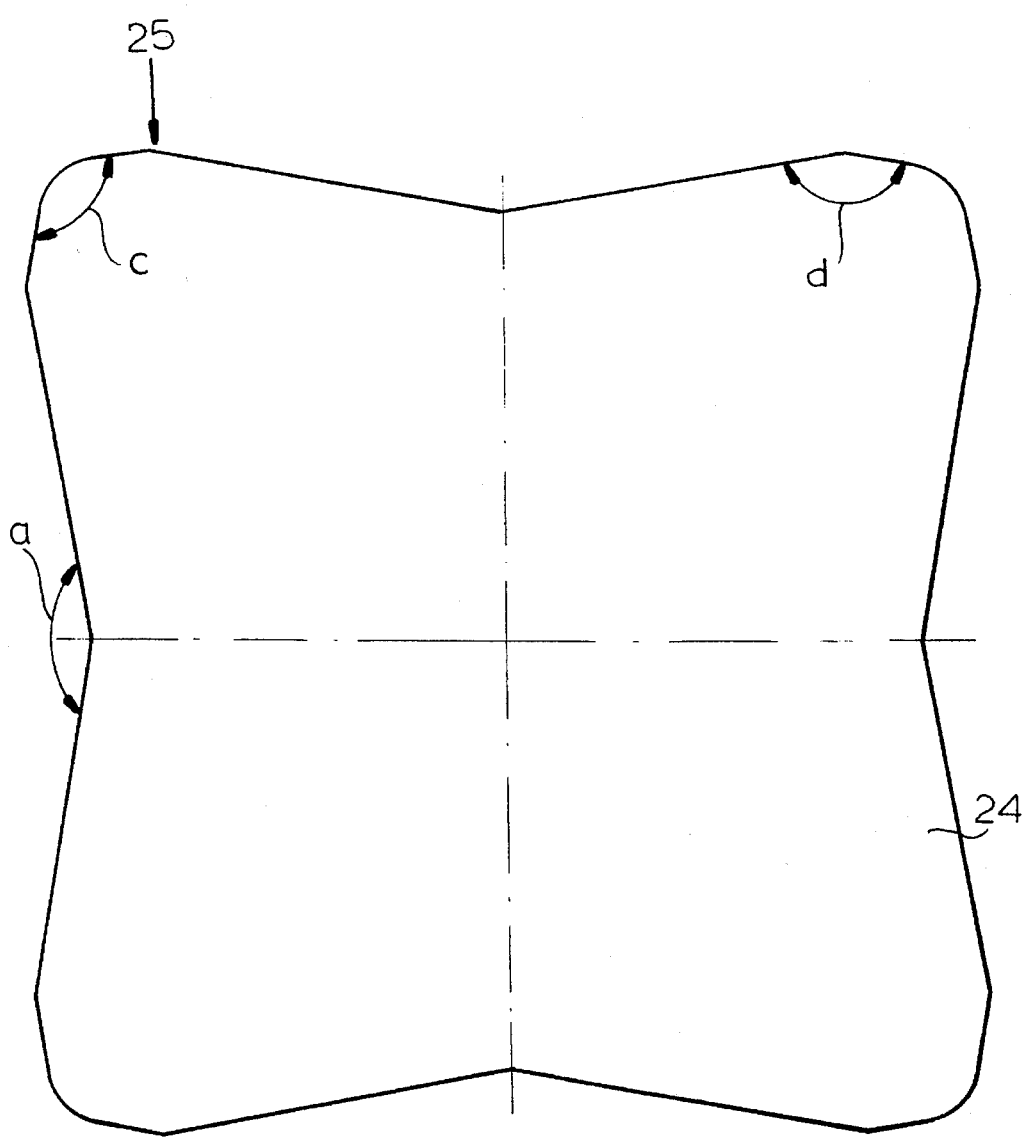

Cutting inserts with a basic square shape are shown in FIGS. 3 and 4. The cutting insert 20 basically corresponds to the cutting insert 10 in FIG. 1 except that each of the four cutting angles 21 have cutting edges 22 arranged between them, whose partial cutting edge segments 22a and 22b are inclined with respect to each other, forming an angle of approximately 160°. As already described with respect to the cutting insert of FIG. 1, for each cutting edge 22 in the corner areas two cutting points 23 are created. In this way the angle of the cutting angles c equals 70°. This cutting plate is also provided with a mounting hole 14.

In a variation of the aforedescribed cutting insert 20, the cutting insert 24 with a basic square shape shown in FIG. 4 has corner angles c increased to approximately 110°. This leads to the formation more sharply defined cutting points 25, which are arranged approximately at the outer quarter of the cutting edge. The roof angle d is 160° like the angle between two adjacent partial cutting edge segments.

Figure 5:
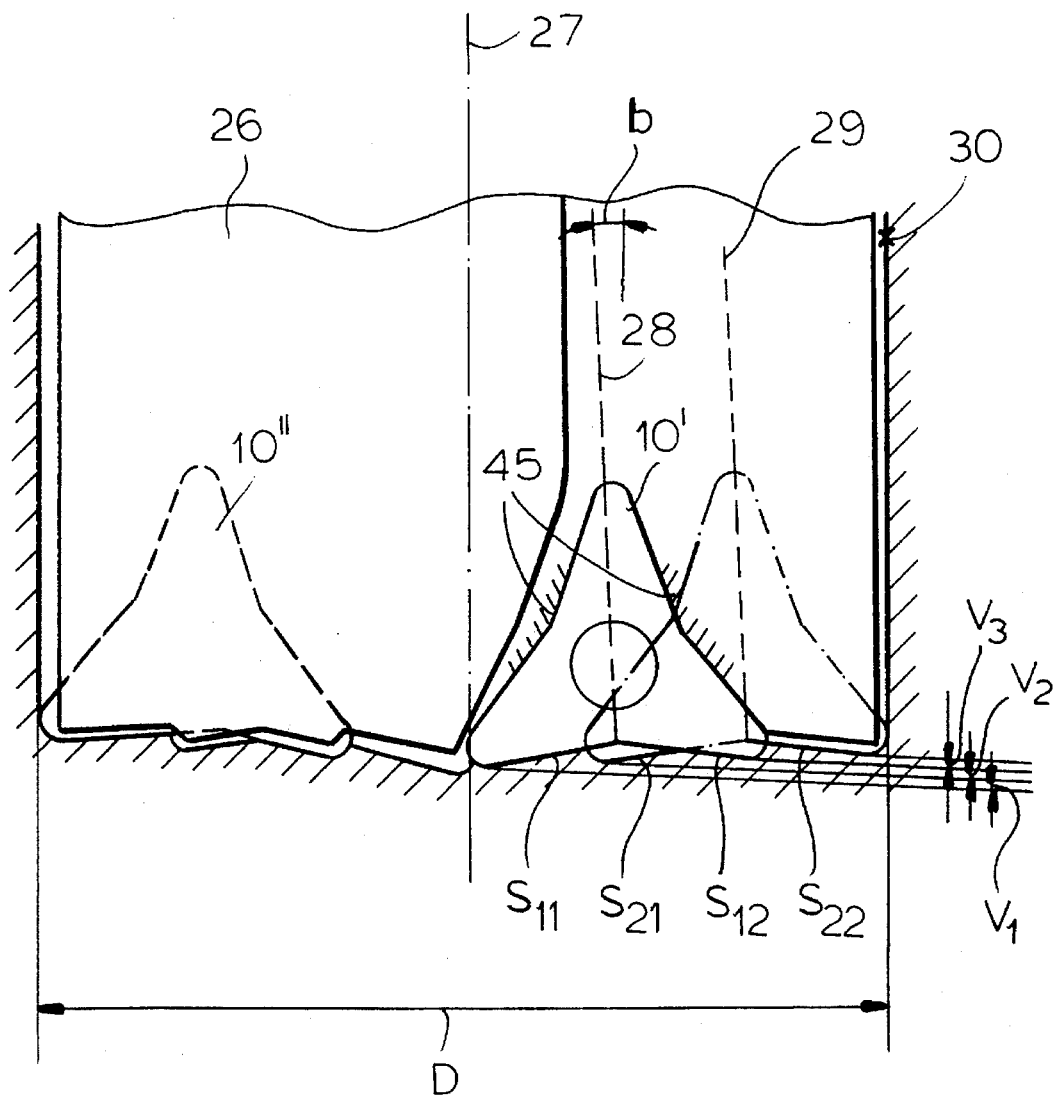
FIGS. 5 and 6 are sectional views of the drilling tool according to the invention with various cutting inserts, each in operation.
Figure 6:
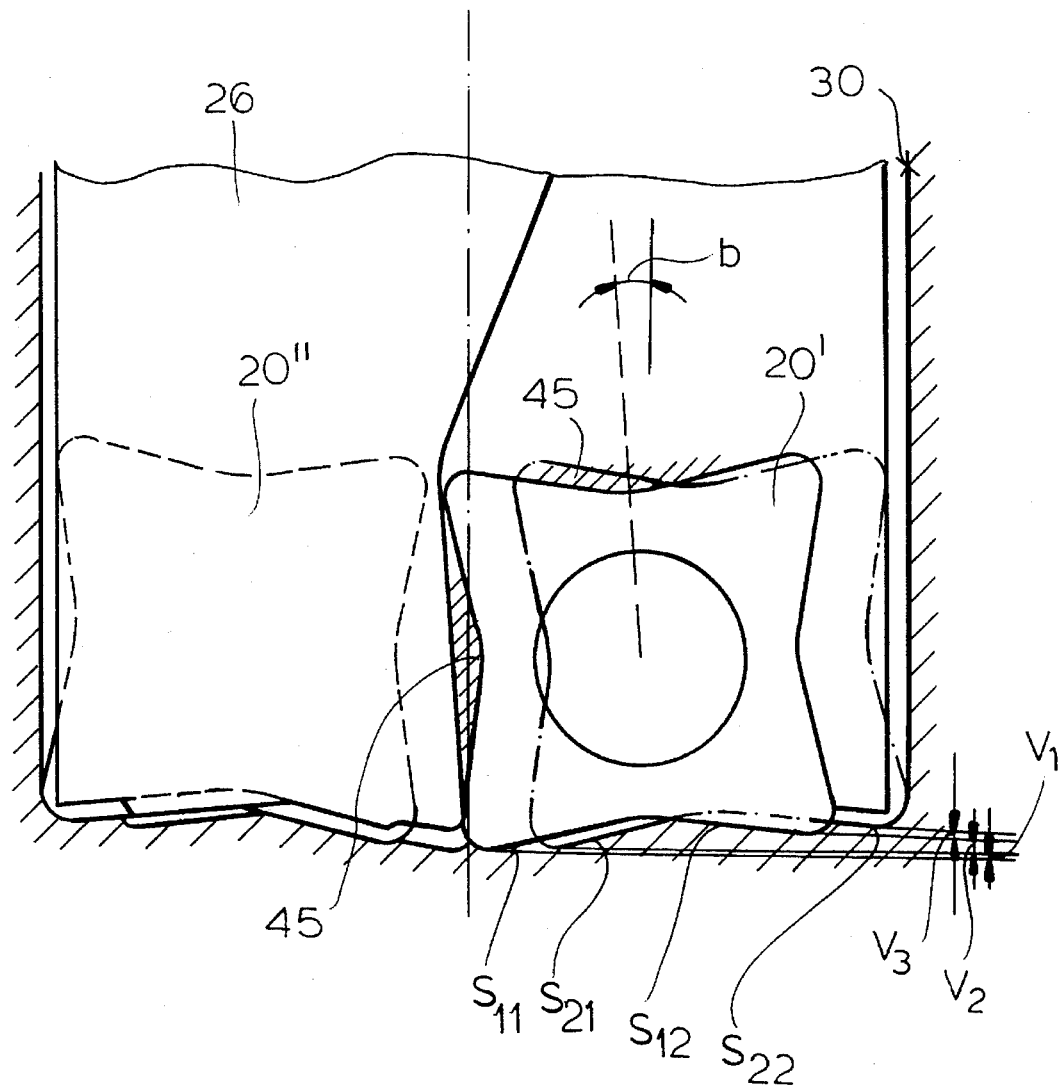

A drilling tool according to the invention, which is fitted with two cutting inserts 10 according to FIG. 1, is shown in FIG. 5. On a shaft 26 cutting inserts 10' and 10" are arranged in recesses in the working end on opposite drill halves. The work ranges of these cutting inserts overlap, as can be seen from the right drill half in the dotted line representation of the cutting insert 10". The drill seats are mutually offset by 180°. The inner cutting insert 10' projects slightly across slightly exceeds the longitudinal drill axis 27 and its perpendicular to the connection line between the cutting angles delimiting the effective cutting edge is inclined with respect to the longitudinal shaft axis by an angle b of approximately 5°, just like the respective perpendicular 29 of the cutting insert 10". In addition the cutting insert 10" is slightly rearwardly offset with respect to the cutting insert 10' by a value $v_1$, which is approximately 0.1 mm. When drilling in solid material 30, when the drill is applied, the cutting edge $S_{11}$, i.e. the inner cutting point first engages the workpiece 30. Due to the selected inclination angle b of the two cutting inserts and the value $v_1$ of the rearward offsetting of the outer cutting insert 10" with respect to the inner cutting insert 10' the first cutting edge $S_{21}$ of the outer cutting insert 10" has its point ahead of the point of the partial cutting edge segment $S_{12}$ by a value $v_2$, which also equals 0.1 mm. The same applies to the lead of the point of cutting edge $S_{12}$ over the cutting edge $S_{22}$, which are offset by a value $v_3$ of 0.1 mm. In each of the cutting inserts 10' and 10" the cutting areas $S_{11}$ and $S_{12}$, or $S_{21}$ and $S_{22}$, create guide surfaces, so that during drilling two chips are formed per indexable insert. The same applies to the drilling tool according to FIG. 6 with the provision that there instead of the substantially triangular cutting inserts, cutting inserts with a basic square shape are used (see FIG. 3). The surface areas of the seats for the cutting plates, wherein the indexable inserts rest, are hatched in the drawing and marked with the reference numeral 45. By contrast, the indexable insert does not rest against the seat in the cutting areas, particularly the cutting points, which is insured by the corresponding recess 37. This form of support applies in a corresponding manner to FIGS. 5, 6, 7a and 7b.

Figure 7A:
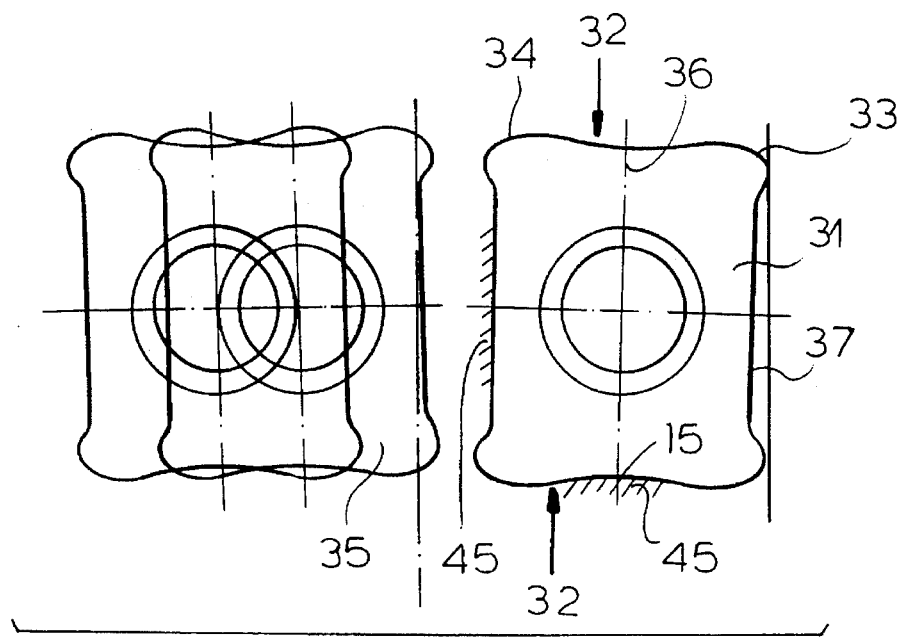
FIG. 7a is a sectional view of a further drilling tool according to the invention.
Figure 7B:
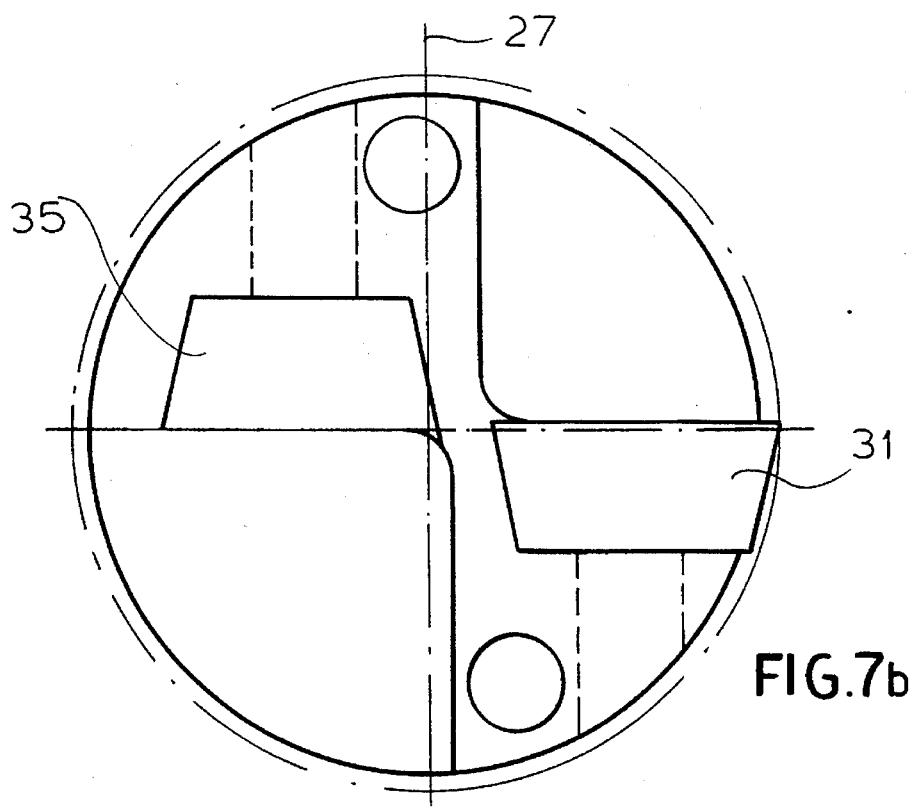

An alternative of the cutting insert according to FIG. 3 can be seen in the right half of FIG. 7a. This cutting insert 31 has also a substantially rectangular basic shape, but only two cutting edges 32 on opposite sides. Each of these cutting edges has a clearly defined convex shape in the middle of the cutting edge, with the constriction or setback 15 already described in FIG. 1, which however in the present case is rounded. By widening the cutting angles 33, per cutting edge 32 two cutting points 34 are formed in the manner already described (see FIG. 4), here these points being also rounded. The inserted position of the cutting inserts 31 and 35, offset by 180°, can be seen in FIG. 7b. Both cutting inserts 31 and 35 are inclined with their median longitudinal axis 36 by an angle of 5° with respect to the longitudinal drill axis 27. The long lateral surfaces 37 of the cutting inserts 31 and 35, which are not designed to be cutting edges, can be equal to or longer than the cutting edge 32.

Figure 8:
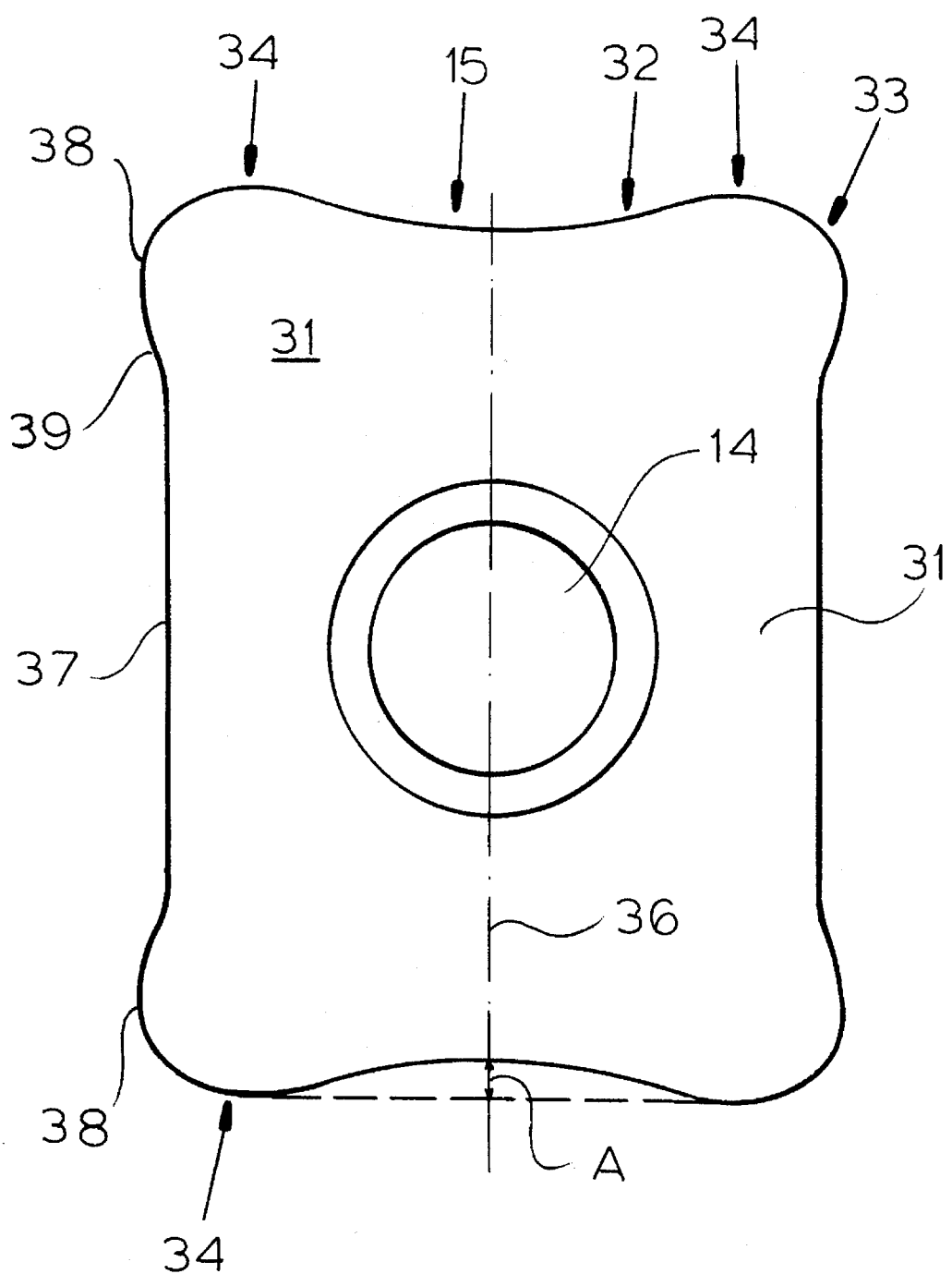
FIG. 8 is a top view of the cutting insert used in FIGS. 7a and 7b.

A cutting insert 31 according to FIG. 7a is shown enlarged in FIG. 8. From this illustration it can be seen that the main cutting edge with the constriction 15, as well as both cutting points 34 which are rounded, are delimited on both sides by the cutting angles 33. However attached to the cutting angles 33 an extension 38 is formed, which basically runs parallel to the longitudinal axis 36 or parallel to the axis 27 (see FIG. 7a). An inclined surface 39 is connected thereto, which blends on both sides into the long lateral surfaces 37. This cutting insert can be modified in the sense that the cutting points 34 can be sharp, as in FIG. 4 (there cutting point 25). Also the cutting angles 33 can have a chamfer in the shape of a rectilinear edge portion.

Figure 9A:
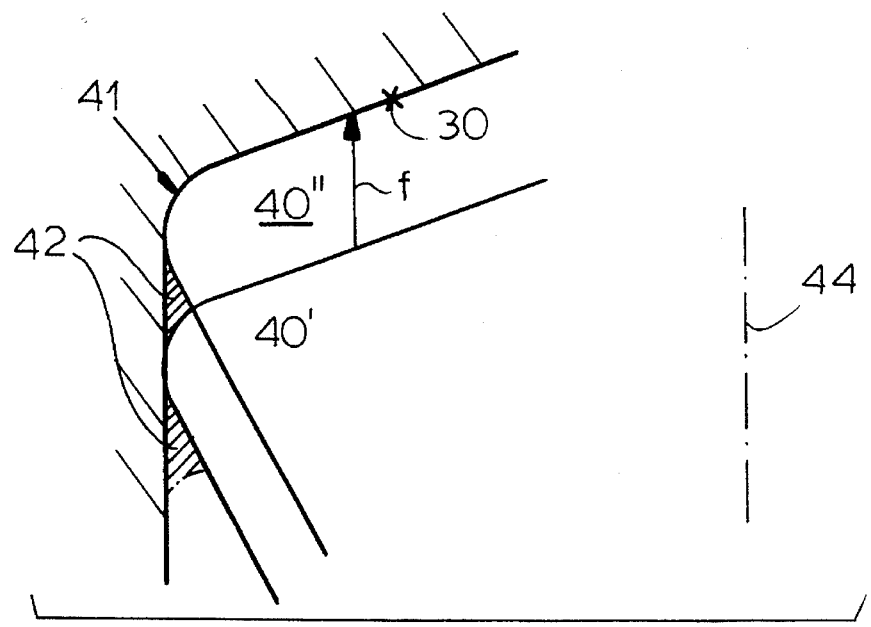
FIGS. 9a and 9b are partial cross-sectional views of a cutting insert during the advance of the drill.
Figure 9B:
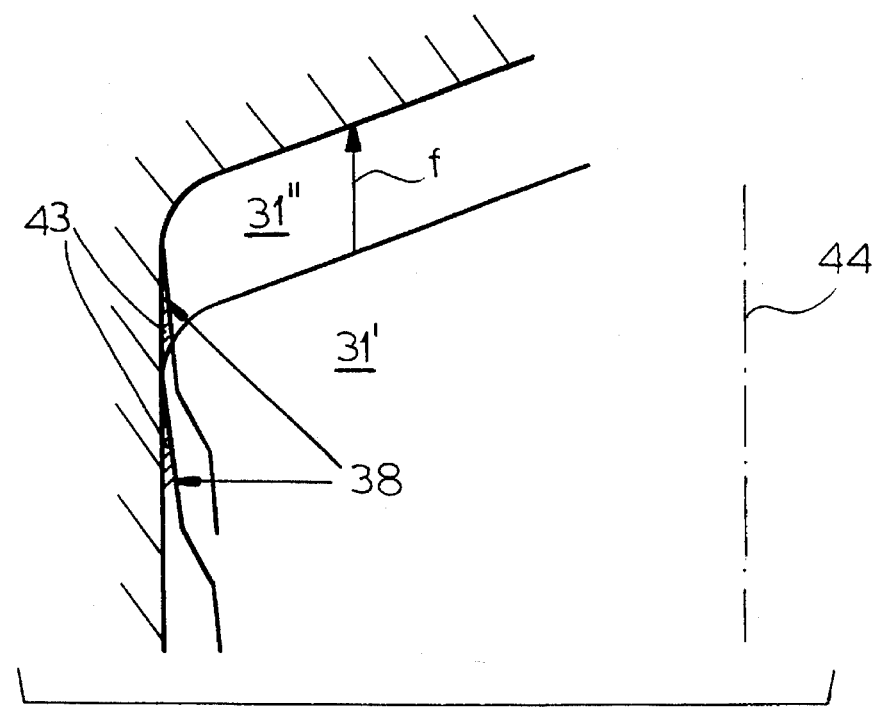

The different effects of the drill with cutting inserts, for instance corresponding to EP 0 054 913 A2 and the cutting inserts according to FIG. 8 can be seen in FIG. 9a and 9b. Here the reference numeral 30 marks the wall of the drill hole formed by a cutting insert 40' respectively 40" which is driven with a drill advance f. The cutting angle 41 however describes a spiral during the advance of the drill, whereby burr-like spiral pieces 42 remain, which in the case of conventionally designed cutting angles represent a quite considerable defect. If an indexable insert according to FIG. 8 with a secondary cutting edge 38 is used, the respective spiral burr 43 is considerably reduced. The respective longitudinal drill-hole axis is indicated at 44.

We claim:

1. A drill comprising a drill shaft having an axis and a cutting end; and at least one cutting insert mounted on said end, said cutting insert comprising a polygonal body formed with at least three cutting vertices and respective cutting edges extending continuously between each two of said cutting vertices and delimiting a rake face of said body, at least one of said cutting edges having a setback substantially midway therealong forming a constriction of said body and subdividing said one of said cutting edges into two mutually inclined outwardly extending rectilinear partial edges including an angle of up to 170° between them, said partial edges running to respective ones of said cutting vertices from said setback and defining respective protruding cutting points at the respective cutting vertices along said one of said cutting edges, whereby two of said cutting points are provided along said one of said cutting edges, said cutting insert being oriented on said end of said shaft such that advance of said shaft into a solid material to be drilled brings both of said points into engagement with the material.

2. The drill defined in claim 1 wherein said angle is 150° to 170°.

3. The drill defined in claim 2 wherein said angle is 160° to 170°.

4. The drill defined in claim 3 wherein said ones of said cutting vertices are rounded.

5. The drill defined in claim 4 wherein said rounded vertices meet said partial cutting edges at respective angles.

6. The drill defined in claim 1 wherein each of said cutting vertices has on one side thereof a main cutting edge forming a respective said one of said cutting edges having a respective setback, and is formed with an extension on an opposite side of the respective vertex from the respective main cutting edge forming a secondary cutting edge which includes an angle of zero to less than 10° with said axis.

7. The drill defined in claim 6 wherein said extension is inclined by 1° to 2° to said axis.

8. The drill defined in claim 7 wherein said extension has a length equal to approximately a distance of advance of the drill upon one turn thereof and equal to up to 0.2 mm in drills up to 20 mm in diameter.

9. The drill defined in claim 7 wherein said vertices have radii of 0.2 to 1.2 mm.

10. The drill defined in claim 7 wherein each vertex has a rectilinear cutting edge region between the respective extension and the respective cutting point at the respective vertex.

11. The drill defined in claim 1 wherein a distance between said setback and a line connecting said two of said vertices and perpendicular to said line is between 0.1 mm and 1.8

12. The drill defined in claim 1 wherein said partial edges are symmetrical to a median through said one of said cutting edges and perpendicular to a line connecting said two vertices.

13. The drill defined in claim 1 wherein said setback is rounded.

14. The drill defined in claim 1 wherein said body is generally triangular.

15. The drill defined in claim 1 wherein said body is generally rectangular.

16. The drill defined in claim 1, further comprising means for mounting said body on said end of said shaft to enable indexing of said insert on said shaft.

17. The drill defined in claim 1 wherein another said cutting insert is mounted on said end of said shaft, a first of said inserts being disposed more outwardly from said axis than a second of said inserts, said second of said inserts being positioned to extend partly past said axis, said inserts having work ranges overlapping on rotation of said shaft, said second insert having an inner cutting point projecting forwardly of an inner cutting point of said first insert, said second insert having an outer cutting point projecting forwardly of an outer cutting point of said first insert and disposed rearwardly of the inner cutting point of said first insert.

18. The drill defined in claim 17 wherein the distances between said inner cutting point along said axis and the outer cutting points of said inserts is greater than 0.02 mm.

19. The drill defined in claim 17 wherein perpendiculars to lines joining the cutting points of said inserts include angles with said axis between one and 10°.

* * * * *